US011155702B2

(12) United States Patent
Chapman et al.

(10) Patent No.: US 11,155,702 B2
(45) Date of Patent: *Oct. 26, 2021

(54) DEGRADABLE POLYMER AND METHOD OF PRODUCTION

(71) Applicant: POLYMATERIA LIMITED, London (GB)

(72) Inventors: Graham Chapman, London (GB); Christopher Wallis, London (GB); Gavin Hill, London (GB)

(73) Assignee: Polymateria Limited, London (GB)

( * ) Notice: Subject to any disclaimer, the term of this patent is extended or adjusted under 35 U.S.C. 154(b) by 161 days.

This patent is subject to a terminal disclaimer.

(21) Appl. No.: 16/463,048

(22) PCT Filed: Nov. 21, 2017

(86) PCT No.: PCT/EP2017/079914
§ 371 (c)(1),
(2) Date: May 22, 2019

(87) PCT Pub. No.: WO2018/095905
PCT Pub. Date: May 31, 2018

(65) Prior Publication Data
US 2019/0309147 A1  Oct. 10, 2019

(30) Foreign Application Priority Data

Nov. 22, 2016 (GB) .................................... 1619746
Dec. 2, 2016 (EP) .................................... 16275171

(51) Int. Cl.
| | |
|---|---|
| *C08L 23/06* | (2006.01) |
| *C08J 3/22* | (2006.01) |
| *C08L 23/02* | (2006.01) |
| *B29C 48/00* | (2019.01) |
| *B29C 48/08* | (2019.01) |
| *B29K 23/00* | (2006.01) |
| *B29K 105/00* | (2006.01) |
| *B29L 31/00* | (2006.01) |

(52) U.S. Cl.
CPC ............ *C08L 23/06* (2013.01); *C08J 3/226* (2013.01); *C08L 23/02* (2013.01); *B29C 48/022* (2019.02); *B29C 48/08* (2019.02); *B29K 2023/0625* (2013.01); *B29K 2105/0044* (2013.01); *B29K 2995/006* (2013.01); *B29L 2031/7129* (2013.01); *C08L 2201/06* (2013.01); *C08L 2201/08* (2013.01); *C08L 2205/03* (2013.01); *C08L 2207/066* (2013.01); *C08L 2310/00* (2013.01)

(58) Field of Classification Search
None
See application file for complete search history.

(56) References Cited

U.S. PATENT DOCUMENTS

| | | |
|---|---|---|
| 3,935,141 A | 1/1976 | Potts et al. |
| 4,565,847 A | 1/1986 | Bahl et al. |
| 4,931,488 A | 6/1990 | Chiquet |
| 5,135,966 A | 8/1992 | Chatterjee et al. |
| 5,216,043 A * | 6/1993 | Sipinen ............... C08K 5/0033 523/125 |
| 5,416,133 A | 5/1995 | Garcia et al. |
| 5,854,304 A | 12/1998 | Garcia et al. |
| 6,387,528 B1 * | 5/2002 | Pomplun ................ B32B 27/08 428/508 |
| 10,570,263 B2 | 2/2020 | Wallis et al. |
| 2003/0236325 A1 | 12/2003 | Bonora |
| 2003/0236371 A1 * | 12/2003 | Wilson, Jr. ............ C08F 214/26 526/266 |
| 2009/1004389 | 4/2009 | Gardi et al. |
| 2015/0037865 A1 | 2/2015 | Weder et al. |

FOREIGN PATENT DOCUMENTS

| | | |
|---|---|---|
| CL | 199600413 | 12/1996 |
| CL | 201503698 | 12/2015 |
| CN | 1092083 A | 9/1994 |
| CN | 1092084 A | 9/1994 |
| CN | 1312318 A | 9/2001 |

(Continued)

OTHER PUBLICATIONS

International Search Report and Written Opinion, PCT/EP2017/079914, dated Jan. 19, 2018, 12 pages.
Great Britain Search Report, Application No. 1619746.9, dated Jul. 21, 2017, 1 page.
Fontanella et al., "Comparison of the biodegradability of various polyethylene films containing pro-oxidant additives," Polymer Degradation and Stability, 95, (2010), pp. 1011-1021.

(Continued)

*Primary Examiner* — Robert T Butcher
(74) *Attorney, Agent, or Firm* — Stinson LLP

(57) ABSTRACT

A degradable polymer composition comprising:
(a) a polyolefin;
(b) two or more transition metal compounds in a total amount of from 0.15 to 0.6 wt %,
(c) a mono- or poly-unsaturated $C_{14}$-$C_{24}$ carboxylic acid, or an ester, anhydride or amide thereof, in an amount of from 0.04 to 0.08 wt %;
(d) a synthetic rubber in an amount of from 0.04 to 0.2 wt %;
and, optionally:
(e) dry starch in an amount of from 0 to 20 wt %; and/or
(f) calcium oxide in an amount of from 0 to 1 wt %; and/or
(g) a phenolic antioxidant stabilizer in an amount of from 0 to 0.2 wt %;
wherein the two or more transition metal compounds are selected from iron, manganese, copper, cobalt and cerium compounds and wherein the transition metals in the two or more transition metal compounds are different.

20 Claims, No Drawings

(56) References Cited

FOREIGN PATENT DOCUMENTS

| CN | 103408827 A | 11/2013 | | |
|---|---|---|---|---|
| CN | 103642109 A | 3/2014 | | |
| CN | 103834084 A | 6/2014 | | |
| CN | 104910499 A | 9/2015 | | |
| CN | 105075751 A | 11/2015 | | |
| CN | 105566690 A | 5/2016 | | |
| CN | 105838049 A | 8/2016 | | |
| CN | 105906917 A | 8/2016 | | |
| EP | 0301676 | 2/1989 | | |
| EP | 0616622 B1 | 2/1996 | | |
| GB | 2272700 A | 5/1994 | | |
| JP | 47-27244 A | 10/1972 | | |
| WO | 9211298 A1 | 7/1992 | | |
| WO | 93/11941 | 6/1993 | | |
| WO | 93/12171 | 6/1993 | | |
| WO | 9413735 A1 | 6/1994 | | |
| WO | WO-03050178 A1 * | 6/2003 | ............. | C08K 5/098 |
| WO | 2005/000940 | 1/2005 | | |

OTHER PUBLICATIONS

Fontanella et al., "Comparison of the biodegradability of various polypropylene films containing pro-oxidant additives based on Mn/Mn/Fe or Co," Polymer Degradation and Stability, 98, (2013), pp. 875-884.

M. Tolinski Additives for Polyolefins: Getting the Most out of Polypropylene, Polyethylene, and TPO, 2015 (second edition) ISBN: 9780323371773.

Liu et al., "Accelerating the Degradation of Polyolefins Through Additives and Blending," Journal of Applied Polymer Science, 2014, vol. 131, Issue18, 15 pages.

Ammala et al., "An overview of degradable and biodegradable polyolefins," Progress in Polymer Science, vol. 36, No. 8, Aug. 2011, pp. 106.

"Rapid Inspection Handbook of Plastic and Rubber Auxiliaries," edited by Zhang Yulong, p. 97, China Textile Publishing House, Aug. 2012, 3 pages.

"Practical Techniques for Plastics Modification." Xu Tongkao, p. 57, China Light Industry Press, Oct. 2012, 3 pages.

Hyun Jeong Jeon et al., "Degradation of linear low density polyethylene (LLDPE) exposed to UV-irradiation," European Polymer Journal, vol. 52, Mar. 2014, pp. 146-153, (Abstract 2 pages).

* cited by examiner

DEGRADABLE POLYMER AND METHOD OF PRODUCTION

This is a U.S. national stage application based on PCT application PCT/EP2017/079914 filed Nov. 21, 2017 and claims priority to application GB 1619746.9 filed Nov. 22, 2016 and application EP 16275171.3 filed Dec. 2, 2016, the entire disclosures of which are expressly incorporated herein by reference.

FIELD OF THE INVENTION

This disclosure relates to a polymer composition, in particular to a degradable composition with a tuneable degradation rate and improved material properties, and a method of production of the same.

BACKGROUND OF THE INVENTION

Polymer materials have many benefits and can provide strong, chemically and biologically inert materials at relatively low cost. Unfortunately many of these characteristics make them difficult to dispose of without causing lasting damage to the environment. Their low cost and favourable mechanical properties means polymer materials are often used with a very short functional life. This leads to rapid build-up of waste material which is inert to most physical and chemical action to which they are subjected during conventional disposal (e.g. dumping in landfill sites).

As the population becomes more aware of human effect on our climate, our ecosystems and the planet as a whole, there is growing demand to reduce the amount of non-degradable waste being disposed of in landfill sites. Accordingly, there is a growing demand for degradable alternatives to conventional polymer materials. In particular, there is a large demand for degradable polymer compositions which may be formed into sheets and films for use in various common applications, such as packaging.

Several degradable polymer compositions have been developed. However, there are significant disadvantages associated with these conventional degradable polymers. Conventional degradable polymers (such as aliphatic polyesters) are generally more difficult and complicated to process, resulting in lower output. These materials have significantly higher densities and lower strength than conventional non-degradable commodity polymers.

U.S. Pat. No. 4,016,117 discloses the use of biodegradable filler materials, such as starch, and an autoxidising substance such as a fat which when exposed to transition metals in soil yield peroxides which attack carbon-carbon linkages in the resin.

U.S. Pat. No. 4,931,488 discloses the addition of a biologically degradable substance (starch), an iron compound (FeOH(stearate)$_2$), and a fatty acid or fatty acid ester (such as soya oil which is a mix of fatty acid esters) to a thermoplastic polymer. The resultant plastic composition degrades under the action of heat and/or ultraviolet light and/or insolation. These compositions have disadvantageous abiotic degradation and biodegradation rates.

SUMMARY OF THE INVENTION

Accordingly, it is desirable to provide degradable polymer compositions and method of manufacture that tackles at least some of the problems associated with the prior art or, at least, to provide a commercially useful alternative thereto.

It is also a feature of the present invention that polyolefin-based plastics incorporating the additive, before the onset of degradation, can be recycled in existing polyolefin recycling streams.

According to a first aspect the present disclosure provides a degradable polymer composition comprising:
(a) a polyolefin;
(b) two or more transition metal compounds in a total amount of from 0.15 to 0.6 wt %;
(c) a mono- or poly-unsaturated $C_{14}$-$C_{24}$ carboxylic acid, or an ester, anhydride or amide thereof, in an amount of from 0.04 to 0.08 wt %;
(d) a synthetic rubber in an amount of from 0.04 to 0.2 wt %;
and, optionally:
(e) dry starch in an amount of from 0 to 20 wt %; and/or
(f) calcium oxide in an amount of from 0 to 1 wt %; and/or
(g) a phenolic antioxidant stabilizer in an amount of from 0 to 0.2 wt %;
    wherein the two or more transition metal compounds are selected from iron, manganese, copper, cobalt and cerium compounds and wherein the transition metals in the two or more transition metal compounds are different.

DETAILED DESCRIPTION OF PREFERRED EMBODIMENTS

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The invention relates to a degradable polymer composition. The following description uses the term degradable polymer to refer to synthetic polymer compositions which breakdown into $CO_2$, $H_2O$, biomass and inorganic salts under normal composting conditions and in other environments.

The degradable polymer composition comprises a polyolefin. This forms the majority of the composition, such as preferably at least 50 wt %. The following description uses the term polyolefin to refer to the class of polymers comprising repeat units of the general formula —[$CH_2CRR'$]—, preferably wherein R and R' are individual selected from the list comprising hydrogen, methyl, ethyl, acetate, vinylacetate, methyl methacrylate, vinyl alcohol and acrylic acid. Preferably the polyolefin forms the balance of the degradable polymer composition along with the listed components. Preferably the degradable polymer composition includes less than 5% of other ingredients, more preferably less than 1%, most preferably the degradable polymer composition is essentially free of further ingredients or impurities.

Preferably the polyolefin comprises ethylene and/or propylene monomers and optionally further comprises monomers selected from the list comprising acetate, vinylacetate, methyl methacrylate, vinyl alcohol and acrylic acid. Preferably the polyolefin is selected from LDPE, LLDPE, HDPE, MDPE, VLDPE, EVA, EVOH, EMMA and EAA.

The degradable polymer composition comprises two or more transition metal compounds in a total amount of from 0.15 to 0.6 wt %, preferably 0.2 to 0.3 wt %. The following description uses the term transition metal to refer to any of the metallic elements of groups IVB-VIII, IB, and IIB, or 4-12 in the periodic table. Preferred transition metals are iron, manganese, copper, cobalt and cerium, preferably where the iron is used it is in the +3 oxidation state and where copper is used it is in the +2 oxidation state. These compounds catalyse the degradation. Including large amounts of transition metal increases the cost of the degradable composition and may lead to transition metal build-up in waste disposal sites. Additionally, since the transition metal plays a catalytic role in the degradation process, increasing the transition metal content above these amounts has a decreasing impact on the degradation rate.

The two or more transition metal compounds are selected from iron, manganese, copper, cobalt and cerium compounds and the transition metals in the two or more transition metal compounds are different. Preferably the two or more transition metal compounds are selected from ferric, manganese, copper, cobalt and cerium compounds and the transition metals in the two or more transition metal compounds are different.

Preferably the transition metal in the two or more transition metal compounds comprise:
  (i) iron, manganese and copper; or
  (ii) manganese and copper; or
  (iii) iron and manganese.

The temperature of the polymer composition as well as its exposure to light may also effect its degradation rate. The present inventors have surprisingly found that the choice of transition metal can be used to further tune these effects. In particular the present inventors have found that iron is a more efficient photo catalyst whilst manganese is a more efficient thermal catalyst of the degradation process. The transition metal component may, therefore, be used to tune the degradation rate depending on the expected exposure to heat and light of a particular product.

Specific transition metals may have effects on the properties of the polymer composition. For example, iron compounds may colour the polymer composition.

Additionally, other metals such as copper advantageously increase the degradation rate but may make the polymer composition unsuitable for certain applications such as use as a food wrap, due to its toxicity. Accordingly, in colour sensitive compositions iron may be avoided, whereas if the product is for use in the food industry copper may be avoided.

Preferably, the ligands of the metal compounds are inorganic ligands and/or saturated organic ligands. Preferably the ligands of the metal compounds do not comprise mono- or poly-unsaturated C14-C24 carboxylic acid, or an ester, anhydride or amide thereof.

Preferably the transition metal compounds comprise moieties selected from stearate, carboxylate, acetylacetonate, triazacyclononane or combinations of two or more thereof. Preferably, the transition metal compounds may be present with a weight ratio of iron stearate and manganese stearate to copper stearate is from 4:1 to 8:1. Preferably, the transition metal compounds may be present with a ratio of ferric stearate and manganese stearate to copper stearate is from 4:1 to 8:1.

Alternatively or in addition, certain non-ionic ligands that play an active role in the degradation may also be included. Where present, the non-ionic ligands are preferably selected from amines, imines, amides, phosphites, phosphines, and carbenes. The present inventors have found that such non-ionic ligands can have an advantageous effect on the degradation rate of the composition whilst maintaining the essential material properties. Non-ionic ligands preferably constitute at least 5% of the ligands and preferably up to 50% of the ligands, preferably 10 to 40% of the ligands.

Preferably the transition metal ligands are chosen in order to make the transition metal physically and chemically compatible with the polymer. Advantageously, ligand selection may affect the transition metal's catalytic activity. The ligands may be chosen to make the metal compatible with the particular polyolefin used and to control the degradation rate of the polymer composition.

The degradable polymer composition comprises a mono- or poly-unsaturated $C_{14}$-$C_{24}$ carboxylic acid in an amount of from 0.04 to 0.08 wt %, preferably 0.04 to 0.06 wt %. The following description uses the term carboxylic acid to refer to the range of molecules containing a carboxylic acid —(COOH) moiety. The carboxylic acid of the present invention is mono- or poly-unsaturated and has a carbon backbone containing between 14 and 24 carbon atoms, meaning it has at least one double in the carbon backbone. The carbon backbone of the carboxylic acid may be linear, branched or aromatic. Preferably the mono- or poly-unsaturated carboxylic acid is a $C_{16}$-$C_{20}$ carboxylic acid. Preferred carboxylic acids are oleic, linoleic and cinnamic, most preferably the carboxylic acid is oleic acid.

Alternatively, the degradable polymer composition comprises an ester, anhydride or amide of a mono- or poly-unsaturated $C_{14}$-$C_{24}$ carboxylic acid in an amount of from 0.04 to 0.08 wt %, preferably 0.04 to 0.06 wt %.

The carboxylic acid or an ester, anhydride or amide components are preferably "free" or "non-coordinated", in the sense that they do not form a part of a transition metal compound.

Where the degradable polymer composition comprises an ester of a mono- or poly-unsaturated $C_{14}$-$C_{24}$ carboxylic acid the alcohol component preferably comprises a $C_1$-$C_{30}$ alcohol, more preferably a saturated straight chain $C_1$-$C_{30}$ alcohol.

Where the degradable polymer composition comprises an anhydride of a mono- or poly-unsaturated $C_{14}$-$C_{24}$ carboxylic acid, the anhydride may or may not be symmetrical. The second carboxylic acid component preferably comprises a $C_1$-$C_{30}$ carboxylic acid, more preferably a saturated straight chain $C_1$-$C_{30}$ carboxylic acid.

Where the degradable polymer composition comprises an amide of a mono- or poly-unsaturated $C_{14}$-$C_{24}$ carboxylic acid the amide may be a primary, secondary or tertiary amide. Where a secondary or tertiary amide is present, each of the carbon chains preferably comprises from 1 to 30 carbon atoms, more preferably each carbon chain is a $C_1$-$C_{30}$ alkyl group.

Unless otherwise specified, where features of the carboxylic acid are discussed in this description it is intended to also encompass the ester, anhydride or amide thereof.

Without wishing to be bound by theory, it is believed that the mono- or poly-unsaturated $C_{14}$-$C_{24}$ carboxylic acid in the polymer composition autoxidises to yield peroxides which can attack the carbon-carbon linkages of the polymer chain, making the polymer susceptible to normal degradation processes. The presence of transition metals catalyse the autoxidation increasing the degradation rate of the polymer composition.

Including more than 0.08 wt % mono- or poly-unsaturated $C_{14}$-$C_{24}$ carboxylic acid may cause the polymer to be excessively air sensitive. Excessive autoxidation of the carboxylic acid may cause relatively high peroxide concentrations and rapid breakdown of the polymer structure. This may cause shelf life issues. Conversely, including less than 0.04 wt. % mono- or poly-unsaturated $C_{14}$-$C_{24}$ carboxylic acid may lead to a negligible degradation rate. The inventors have found that including the between 0.04 and 0.08 wt. % mono- or poly-unsaturated $C_{14}$-$C_{24}$ carboxylic acid allows tuning of the degradation rate to desirable values for many applications.

Surprisingly, the present inventors have found that linear mono-unsaturated acids, and in particular oleic acid, show the greatest effect on degradation rate. This would not be expected by the chemical stability of these compounds in isolation since, in general, the more double bonds in a carboxylic acid the more susceptible to oxidation it is.

The degradable polymer composition comprises a synthetic rubber in an amount of from 0.04 to 0.2 wt %, preferably 0.08 to 0.12 wt %, most preferably about 0.1 wt %. The following description uses the term rubber to refer to viscous, elastic polymers. Rubbers are amorphous polymers which exist at temperatures above their glass transition temperature. Preferably the rubber of the present invention is an unsaturated rubber, more preferably the rubber of the present invention comprises polyisoprene, styrene-isoprene, styrene-isoprene-styrene, or a blend of two or more thereof.

The rubber content may advantageously improve the mechanical properties of the polymer composition. Additionally, rubbers are generally less chemically stable than the bulk polyolefin. Accordingly, the rubber content may improve the degradation rate without adversely affecting the physical properties of the polymer. In this way it seems to act as a co-catalyst.

Advantageously, the presence of the synthetic rubber in the polymer composition improves the elasticity. This helps to counteract the embrittlement of the polymer composition caused by the other additives. Including less than 0.04% synthetic rubber may lead to the polymer being excessively brittle and unsuitable. Including more than 0.12% synthetic rubber may lead to rapid degradation rates and may adversely affect the material properties of the polymer. Additionally, it is believed that the synthetic rubber content increases the degradation rate without the need to increase the transition metal, starch, or carboxylic acid content.

The degradable polymer composition optionally comprises dry starch in an amount of from 0 to 20 wt %, preferably 0 to 10 wt %, more preferably 0.1 to 1 wt % and most preferably 0.1 to 0.4 wt %. The following description uses the term starch to refer to a polysaccharide comprising a large number (general 500-2,000,000 monomer units) of glucose units joined by glycosidic bonds. The starch of the present invention is dry starch, that is the starch contains less that 5 wt % water, preferably less than 1 wt % water, most preferably the starch contains essentially no water.

Including large quantities of starch may increase the density and reduce the tensile strength of the polymer. Additionally, high starch contents may lead to shelf life problems due to rapid degradation. High starch contents make the polymer content susceptible to cosmetic and physical damage due to exposure to water and microorganisms. If insufficient starch is included the additive may have an insignificant effect on the biodegradation rate.

The degradable polymer composition optionally comprises calcium oxide in an amount of from 0 to 1 wt %, preferably from 0 to 0.4 wt %, more preferably from 0.1 to 0.3 wt %. The following description uses the term calcium oxide to refer to the crystalline solid with the chemical formula CaO. Advantageously calcium oxide reacts with and immobilises water in the composition. This stabilises the composition during processing and may reduce the occurrence of blemishes and discoloration of the final product. Surprisingly and unexpectedly the present inventors have also found that increasing the calcium oxide content of the polymer composition may increase the degradation rate. Advantageously, the CaO content may be used to improve degradability without the need of increasing the transition metal of starch content. Including more than 0.4 wt % CaO leads to embrittlement of the polymer.

The degradable polymer composition optionally comprises an oxygen generating additive. Oxygen generating additives may be organic or inorganic. Preferably, the oxygen generating additive is selected from nitrates, peroxides, sulphates and phosphates or combinations of two or more thereof. Preferably the oxygen generating additive is calcium nitrate. Preferably the oxygen generating additive is present in an amount of from 0.1 to 1.0 wt %. The oxygen-generating additive was found to further accelerate the rate of the oxidation of the polymer.

The degradable polymer composition optionally comprises a phenolic antioxidant stabilizer in an amount of from 0 to 0.2 wt %, preferably from 0.02 to 0.15 wt %. Phenolic antioxidant stabilisers are well known in the art and include, for example, Irganox 1076 and Irganox 1010. The phenolic antioxidant stabiliser was found to allow increased control over the timing of the degradation of the polymer. Specifically, the inclusion of a phenolic antioxidant stabiliser may delay the onset of degradation increasing the shelf-life of a product and the period in which the product may be recycled in existing polyolefin recycling streams.

Preferably the polymer degrades in at most 90 days in air. For certain applications the polymer needs to embrittle in at most 90 days in a natural environment such as on a field; this can be achieved with this invention.

Preferably the composition further comprises a colour additive, such as, but not exclusively carbon black or titanium oxide.

Accordingly, the present disclosure provides a composition based on a specific combination of ingredients which permits the provision of an ideal degradable composition. In particular the degradation is tuned to the application selected by the blend of these ingredients used.

In a preferred embodiment the present disclosure provides a degradable polymer wherein the composition comprises the polyolefin, together with one or more of:
(b) two or more transition metal compounds, preferably transition metal stearates, in a total amount of from 0.2 to 0.3 wt %; and/or
(c) a mono-unsaturated $C_{16}$-$C_{20}$ linear carboxylic acid, or ester, anhydride or amide thereof, in an amount of from 0.04 to 0.06 wt %; and/or
(d) a synthetic rubber in an amount of from 0.08 to 0.12 wt %; and/or
(e) dry starch in an amount of from 0.1 to 0.4 wt %; and/or
(f) calcium oxide in an amount of from 0.1 to 1 wt %, preferably 0.1 to 0.3 wt %; and/or
(g) phenolic antioxidant stabiliser in an amount from 0.02% to 0.15 wt %; wherein the two or more transition metal compounds are selected from ferric, manganese, copper, cobalt and cerium compounds and wherein the transition metals in the two or more transition metal compounds are different.

In another aspect the present invention provides an additive formulation for forming a degradable polymer composition on addition to a polyolefin, the additive formulation comprising the two or more transition metal compounds, the mono- or poly-unsaturated $C_{14}$-$C_{24}$ carboxylic acid, or ester, anhydride or amide thereof, the synthetic rubber and, optionally, the dry starch and/or the phenolic antioxidant stabiliser and/or the calcium oxide, and wherein the additive formulation further comprises a carrier polymer and is for dilution in the polyolefin in an amount of from 1 to 20 wt % of the additive formulation in the degradable polymer composition, preferably 1 to 4 wt %.

The additive formulation is suitable for forming the polymer composition of the present disclosure.

In another aspect the present invention provides a method for forming a degradable polymer composition, the method comprising:
(i) forming an additive formulation by hot-extruding under a nitrogen atmosphere a carrier polymer, two or more transition metal compounds, mono- or poly-unsaturated $C_{14}$-$C_{24}$ carboxylic acid, a synthetic rubber and, optionally, calcium oxide and/or a phenolic antioxidant stabiliser;
(ii) optionally adding starch;
(iii) blending the additive with a polyolefin to form a blend comprising 1 to 20 wt % of the additive, preferably 1 to 4 wt % of the additive.

Preferably, the additive may be obtainable by a method comprising mixing, by combined weight of the additive and the polymer:
(a) two or more transition metal compounds in a total amount of from 0.15 to 0.6 wt %;
(b) a mono- or poly-unsaturated $C_{14}$-$C_{24}$ carboxylic acid, or an ester, anhydride or amide thereof, in an amount of from 0.04 to 0.08 wt %;
(c) a synthetic rubber in an amount of from 0.04 to 0.2 wt %;
and, optionally:
(d) dry starch in an amount of from 0 to 20 wt %; and/or
(e) calcium oxide in an amount of from 0 to 1 wt %; and/or
(f) a phenolic antioxidant stabilizer in an amount from 0 to 0.2 wt %;
wherein the two or more transition metal compounds are selected from iron, manganese, copper, zinc, titanium, cobalt and cerium compounds and wherein the transition metals in the two or more transition metal compounds are different.

The method is suitable for forming the polymer composition of the invention. The additive formulation of the invention is suitable for use in the method.

The addition of starch after the hot extrusion step avoids exposing the starch to elevated temperatures. When starch is exposed to high temperatures is breaks down to form dextrins. Therefore, the addition of starch after the hot extrusion step maintains its structure and prevents browning and prematurely weakening the polymer structure.

The method of the present invention may further comprise forming the polymer composition into a film having a thickness of from 5 to 50 microns, preferably 10 to 25 microns.

The film may be coated onto a cellulosic substrate such as paper or card.

The method of the present invention may comprise forming the polymer composition into a sheet having a thickness of up to 1000 microns, preferably from 100 to 750 microns.

The method of the present invention may comprise forming the degradable polymer composition into an extruded-cast sheet having a thickness of up to 1000 microns. Such a sheet can then be thermoformed into numerous products using known techniques. Alternatively, the method may comprise forming the degradable polymer composition into an injection moulded plastic product, such as a container or a bottle.

The degradable polymer of the present invention may have a tuneable degradation rate. That is, by selecting specific additive components and amounts the rate of degradation of the polymer may be controlled. For certain applications, particularly some agricultural applications, embrittlement of the film needs to be achieved in 90 days. Subsequent biodegradation needs to be sufficiently fast to prevent long term accumulation of polymer fragments. Conversely in order to achieve sufficient shelf-life and use life degradation should only start after a certain period of time. For most products that go through a normal grocery distribution chain this can be as long as 2 years.

Advantageously, unlike conventional degradable polymer compositions, the polymer compositions of the present invention are compatible with many common polymer colour additives such as carbon black and titanium dioxide.

All percentages used in this disclosure are by weight unless otherwise specified.

The invention will now be described in relation to the following non-limiting FIGURES. Further advantages of the disclosure are apparent by reference to the detailed description when considered in conjunction with the Examples.

Example 1

An additive formulation was prepared consisting of:

| | | |
|---|---|---|
| i) | Dried starch | 10.00 wt. % |
| ii) | Manganese stearate | 4.00 wt. % |
| iii) | Ferric stearate | 8.00 wt. % |
| iv) | Copper stearate | 1.30 wt. % |
| v) | Oleic acid | 2.00 wt. % |
| vi) | SIS/SI copolymer | 4.00 wt. % |
| vii) | Calcium oxide | 10 wt. % |
| viii) | LLDPE | 60.70 wt. % |

Example 2

An additive formulation was prepared consisting of:

| | | |
|---|---|---|
| i) | Dried starch | 10.00 wt. % |
| ii) | Manganese stearate | 2.00 wt. % |
| iii) | Ferric stearate | 10.00 wt. % |
| iv) | Irganox 1076 | 13.0 wt. % |
| v) | Oleic acid | 1.00 wt. % |
| vi) | SIS/SI copolymer | 2.00 wt. % |
| vii) | Calcium oxide | 10.00 wt. % |
| viii) | LLDPE | 52.0 wt. % |

Example 3

An additive formulation was prepared consisting of:

| | | |
|---|---|---|
| i) | Dried starch | 10.00 wt. % |
| ii) | Manganese stearate | 4.00 wt. % |
| iii) | Copper stearate | 8.00 wt. % |
| iv) | Oleic acid | 6.00 wt. % |
| v) | SIS/SI copolymer | 2.00 wt. % |
| vi) | LLDPE | 70.00 wt. % |

Examples 1, 2 and 3 were formed by hot extruding components ii-viii then separately adding the starch. By adding the starch separately it may be added after the heating steps, avoiding damaging the structure.

The additive formulation was then blended with a further polyolefin and formed into sheets into a 15 micron film and used to produce garbage bags.

Example 4

An additive formulation was prepared consisting of:

| i)   | Manganese stearate | 4.00 wt. % |
|------|--------------------|-----------|
| ii)  | Ferric stearate    | 8.00 wt. % |
| iii) | Copper stearate    | 1.30 wt. % |
| iv)  | Oleic acid         | 6.00 wt. % |
| v)   | SIS/SI copolymer   | 1.00 wt. % |
| vi)  | Calcium oxide      | 10.00 wt. % |
| vii) | LLDPE              | 69.70 wt. % |

Example 5

An additive formulation was prepared consisting of:

| i)    | Manganese stearate | 4.00 wt. % |
|-------|--------------------|-----------|
| ii)   | Ferric stearate    | 8.00 wt. % |
| iii)  | Copper stearate    | 1.30 wt. % |
| iv)   | Oleic acid         | 2.00 wt. % |
| v)    | SIS/SI copolymer   | 1.00 wt. % |
| vi)   | Calcium oxide      | 10.00 wt. % |
| vii)  | Irganox 1076       | 10.00 wt. % |
| viii) | LLDPE              | 63.70 wt. % |

Examples 4 and 5 were formed by hot extruding the components.

The compositions are summarised below:

|                        | 1    | 2    | 3    | 4    | 5    |
|------------------------|------|------|------|------|------|
| i) Dried starch        | 10.0 | 10.0 | 10.0 |      |      |
| ii) Manganese stearate | 4.0  | 2.0  | 4.0  | 4.0  | 4.0  |
| iii) Ferric stearate   | 8.0  | 10.0 |      | 8.0  | 8.0  |
| iv) Copper stearate    | 1.3  |      | 8.0  | 1.3  | 1.3  |
| v) Oleic acid          | 2.0  | 1.0  | 6.0  | 6.0  | 2.0  |
| vi) SIS/SI copolymer   | 4.0  | 2.0  | 2.0  | 1.0  | 1.0  |
| vii) Calcium oxide     | 10.0 | 10.0 |      | 10.0 | 10.0 |
| viii) LLDPE            | 60.7 | 52.0 | 70.0 | 69.7 | 63.7 |
| ix) Irganox 1076       |      | 13.0 |      |      | 10.0 |

The additive formulation was then blended with a further polyolefin and formed into sheets of a 15 micron film and used to produce garbage bags. The further polyolefin was LLDPE and was provided in an amount sufficient to form 98 wt % of the final polymer.

Under accelerated weathering conditions, the above compositions 1-5 exhibited at least 50% faster decomposition compared to polyethylene alone. In addition, the compositions exhibited at least 10% faster decomposition compared to a control composition of polyethylene containing 0.25% maganese stearate alone (a similar transition metal loading). Even so, the properties of the polyolefin film, such as strength and elasticity, remained unchanged.

Although preferred embodiments of the invention have been described herein in detail, it will be understood by those skilled in the art that variations may be made thereto without departing from the scope of the invention or of the appended claims.

The invention claimed is:

1. A degradable polymer composition comprising:
   (a) a polyolefin;
   (b) two or more transition metal compounds in a total amount of from 0.15 to 0.6 wt %;
   (c) a mono- or poly-unsaturated $C_{14}$-$C_{24}$ carboxylic acid, or an ester, anhydride or amide thereof, in an amount of from 0.04 to 0.08 wt %;
   (d) a synthetic rubber in an amount of from 0.04 to 0.2 wt %;
   and, optionally:
   (e) dry starch in an amount of from 0 to 20 wt %; and/or
   (f) calcium oxide in an amount of from 0 to 1 wt %; and/or
   (g) a phenolic antioxidant stabilizer in an amount of from 0 to 0.2 wt %;
   wherein the two or more transition metal compounds are selected from iron, manganese, copper, cobalt and cerium compounds and wherein the transition metals in the two or more transition metal compounds are different, and
   wherein the weight percent of each additive is based on the combined weight of the additives and the polymer.

2. The degradable polymer of claim 1, wherein the polyolefin comprises ethylene and/or propylene monomers and optionally further comprises monomers selected from the list comprising acetate, vinylacetate, methyl methacrylate, vinyl alcohol and acrylic acid.

3. The degradable polymer of claim 1, wherein the polyolefin is selected from LDPE, LLDPE, HDPE, MDPE, VLDPE, EVA, EVOH, EMMA and EAA.

4. The degradable polymer of claim 1, wherein the polymer degrades in at most 90 days in air.

5. The degradable polymer of claim 1, wherein the transition metal compounds comprise moieties selected from stearate, carboxylate, acetylacetonate, triazacyclononane or combinations of two or more thereof.

6. The degradable polymer of claim 1, wherein the transition metal in the two or more transition metal compounds comprise:
   (i) iron, manganese and copper; or
   (ii) manganese and copper; or
   (iii) iron and manganese.

7. The degradable polymer of claim 6, wherein the degradable polymer comprises iron, manganese and copper, and wherein a weight ratio of iron stearate and manganese stearate to copper stearate is from 4:1 to 8:1.

8. The degradable polymer of claim 1, wherein the composition comprises a phenolic antioxidant stabiliser.

9. The degradable polymer of claim 1, wherein the composition further comprises a colour additive.

10. The degradable polymer of claim 1, wherein the mono- or poly-unsaturated $C_{14}$-$C_{24}$ carboxylic acid is a $C_{16}$-$C_{20}$ linear carboxylic acid.

11. The degradable polymer of claim 1, wherein the synthetic rubber comprises an unsaturated polymer.

12. The degradable polymer of claim 1, wherein the composition comprises:
   (b) two or more transition metal stearates in a total amount of from 0.2 to 0.3 wt %; and/or
   (c) a mono-unsaturated $C_{16}$-$C_{20}$ linear carboxylic acid in an amount of from 0.04 to 0.06 wt %; and/or
   (d) a synthetic rubber in an amount of from 0.08 to 0.12 wt %; and/or
   (e) dry starch in an amount of from 0.1 to 0.4 wt %; and/or
   (f) calcium oxide in an amount of from 0.1 to 0.3 wt %; and/or
   (g) a phenolic antioxidant stabiliser in an amount from 0.02 to 0.15 wt %.

13. An additive formulation for forming the degradable polymer composition of claim 1 on addition to a polyolefin, the additive formulation comprising the two or more transition metal compounds, the mono- or poly-unsaturated $C_{14}$-$C_{24}$ carboxylic acid, the synthetic rubber and, optionally, the dry starch and/or the calcium oxide and/or the phenolic antioxidant stabilizer and wherein the additive formulation further comprises a carrier polymer and is for dilution in the polyolefin in an amount of from 1 to 20 wt % of the additive formulation in the degradable polymer composition.

14. A method for forming the degradable polymer composition of claim 1, the method comprising:
   (i) forming an additive formulation comprising a carrier polymer, the two or more transition metal compounds, the mono- or poly-unsaturated $C_{14}$-$C_{24}$ carboxylic acid, the synthetic rubber and, optionally, the dry starch and/or calcium oxide and/or the phenolic antioxidant stabilizer by hot-extruding under a nitrogen atmosphere the carrier polymer, the two or more transition metal compounds, the mono- or poly-unsaturated $C_{14}$-$C_{24}$ carboxylic acid, the synthetic rubber and, optionally, the calcium oxide and/or the phenolic antioxidant stabilizer;
   (ii) optionally adding starch; and
   (iii) blending the additive formulation with a polyolefin to form a blend comprising 1 to 20 wt % of the additive.

15. The method according to claim 14, further comprising forming the degradable polymer composition into a film having a thickness of from 5 to 50 microns.

16. The method of claim 15, wherein the film is a composite product further comprising a cellulose substrate.

17. The method according to claim 14, further comprising forming the degradable polymer composition into an extruded-cast sheet having a thickness of up to 1000 microns.

18. The method according to claim 14, further comprising forming the degradable polymer composition into an injection moulded plastic product.

19. The degradable polymer claim 9, wherein the colour additive comprise carbon black or titanium oxide.

20. The degradable polymer of claim 11, wherein the unsaturated polymer comprises styrene-isoprene-styrene.

* * * * *